(12) United States Patent
Jeong

(10) Patent No.: US 7,469,028 B2
(45) Date of Patent: Dec. 23, 2008

(54) ASYMMETRICAL DIGITAL SUBSCRIBER LINE SYSTEM

(75) Inventor: Jun-Young Jeong, Suwon-shi (KR)

(73) Assignee: Samsung Electronics Co., Ltd. (KR)

( * ) Notice: Subject to any disclaimer, the term of this patent is extended or adjusted under 35 U.S.C. 154(b) by 702 days.

(21) Appl. No.: 10/770,327

(22) Filed: Feb. 2, 2004

(65) Prior Publication Data

US 2004/0161081 A1    Aug. 19, 2004

(30) Foreign Application Priority Data

Feb. 13, 2003    (KR)    .................. 10-2003-0009158

(51) Int. Cl.
*H04L 7/00*    (2006.01)
*H04L 27/28*    (2006.01)

(52) U.S. Cl. ..................... 375/355; 375/260

(58) Field of Classification Search ............... 375/376, 375/394, 260, 327, 322
See application file for complete search history.

(56) References Cited

U.S. PATENT DOCUMENTS

| 5,524,026 | A  | * | 6/1996  | Murata ........................ 375/329 |
| 5,867,528 | A  | * | 2/1999  | Verbueken .................. 375/222 |
| 6,101,230 | A  |   | 8/2000  | Chun et al. .................. 375/355 |
| 6,310,926 | B1 | * | 10/2001 | Tore ............................ 375/355 |
| 2004/0047296 | A1 | * | 3/2004 | Tzannes et al. ............. 370/252 |

FOREIGN PATENT DOCUMENTS

| EP | 0785645 A1 | 7/1997 |
| EP | 1 221 794 A1 | 7/2002 |
| EP | 1018253 B1 | 8/2007 |
| WO | WO 01/65794 | 9/2001 |

\* cited by examiner

*Primary Examiner*—Shuwang Liu
*Assistant Examiner*—David Huang
(74) *Attorney, Agent, or Firm*—Mills & Onello, LLP

(57) ABSTRACT

An asymmetrical digital subscriber line (ADSL) communication system enhances the signal-to-noise ratio (SNR) of the received signals by conducting a PLL process with a tone conditioned on the most superior SNR, instead of a fixed tone. An improvement in data rate is thereby achieved.

8 Claims, 9 Drawing Sheets

Fig. 2
(Prior Art)

ATU-C:

| C-FLAG2 (G.994.1) | | | | | | | | | |
|---|---|---|---|---|---|---|---|---|---|
| C-GALF2 (G.994.1) | C-QUIET2 (§7.4.1) | C-PILOT1 (§0.4.5) | C-REVERB1 (§7.4.5) | C-PILOT2 (§7.4.6) | C-ECT (§7.4.7) | C-REVERB2 (§7.4.8) | C-QUIET5 (§7.4.9) | C-PILOT3 (§7.4.10) | C-REVERB3 (§7.4.11) |
| | | C-PILOT1A and C-QUIET3A (§7.4.3&4) | | | | | | | |

ATU-R:

| R-FLAG2 (G.994.1) | | | | | |
|---|---|---|---|---|---|
| R-GALF2 (G.994.1) | R-QUIET2 (§7.5.1) | R-REVERB1 (§7.5.2) | R-QUIET3 (§7.5.3) | R-ECT (§7.5.4) | R-REVERB2 (§7.5.5) |

ASYMMETRICAL DIGITAL SUBSCRIBER LINE SYSTEM

This application relies for priority upon Korean Patent Application No. 2003-09158, filed on Feb. 13, 2003, the contents of which are herein incorporated by reference in their entirety.

FIELD OF THE INVENTION

The present invention relates to communication systems and more specifically, to asymmetric digital subscriber line (ADSL) communication systems.

BACKGROUND OF THE INVENTION

With the ever-increasing need for hyper-rate communication systems and with the expanding utility of personal computers, more convenient and less expensive communication systems, with high data rates, are required. Such a need has been met through digital subscriber line communication systems, abbreviated as "xDSL", using conventional copper telephone lines commonly present in homes and offices.

xDSL refers generally to all forms of communication that employ telephone lines, for example, high data-rate DSLs (HDSL) that serve as a substitute for conventional T1 lines, symmetric DSLs that replace T1 or E1 lines by one twisted pair copper line, and asymmetric DSLs capable of transferring a large amount of data in the environment of public switched telephone networks (PSTN).

In ADSL system, the term "asymmetric" arises from the fact that downstream data to be transferred in the direction from a central station CO to a remote terminal has a wider bandwidth and a larger data size as compared to upstream data to be transferred in the direction from the remote terminal to the central station. In the ADSL system, data communication and plain old telephone service (POTS) can be transferred at the same time. In contemporary systems, normal data rates of the ADSL system are 8 Mbps in the downstream direction and 640 Mbps in the upstream direction.

Unfortunately, modulated signals emit energy to adjacent copper wires within the same cable bundle when electrical energy is transmitted through copper wires in a telephone network. This phenomenon of electromagnetic cross-coupling is referred to as "crosstalk". In a typical telephone network, a pair of copper wires insulated from other are joined by a cable binder. At certain transfer rates, pulsating crosstalk interference occurs at a non-negligible level between adjacent systems in cable bundles transceiving information within the same frequency range, resulting in distortion of signal waveforms.

Crosstalk may be classified into two categories. Near-end crosstalk, referred to as NEXT, is an important factor because it causes remarkably large crosstalk on the original signal as a result of a high energy signal being propagated through a nearby system. Far-end crosstalk, referred to as FEXT, is evaluated by measuring disturbance at a far end of a transmission medium after transferring a test signal through a pair of copper wires from an end of a channel. FEXT is therefore useful for determining crosstalk noise for data communication with devices located at counter ends of the copper wires. The dimension of the FEXT is generally smaller than the NEXT because an interference signal of the FEXT degrades during transport along the copper wires during signal transmission.

ADSL modems come in many forms, including annex-A, annex-B, and annex-C in accordance with application environments. The annex-A modem includes the steps of HS/T1413, training, channel analysis, messaging, exchanging, and showtime. A phase-locked loop (PLL) operation is carried out in the training step to set loop timing between a central station and a terminal, and should be continuous to retain the loop timing. The annex-A modem uses the 64'th one among 256 carriers for the PLL operation, i.e., tone No. 64 (hereinafter, referred to as #64 tone), and encodes channels in the form of quadrature amplitude modulation (QAM) up to 15 bits at maximum. A transceiving signal during an initialization process, before HS or T1413, is provided according to a 4QAM procedure using two bits. After completing the process of HS or T1413, the central station sends constellation information of (+1, +i) with the #64 tone. The constellation information on the #64 tone is successively retained without disconnection but during an echo cancel training period. A remote terminal may restore the same timing with the central station by means of the constellation information about the #64 tone.

An ADSL receiver of a remote terminal 10, shown in FIG. 1, includes an analog-to-digital converter (ADC) 11, a time-domain equalizer (TEQ) 12, a serial-to-parallel (S/P) converter 13, a fast Fourier transformer (FFT) 14, a frequency-domain equalizer (FEQ) 15, a QAM decoder 16, a digital phase lock loop (DPLL) 17, a digital-to-analog (DAC) converter 18, and a voltage-controlled crystal oscillator (VCXO) 19. The DPLL 17 includes a phase detector 21 and a loop filter 22. The DPLL 17, the DAC 18 and the VCXO 19 form a clock recovery loop in the ADSL receiver.

The ADSL system generally uses a discrete multi-tone (DMT) coding technique associated with providing a multiplicity of channels for information transmission. The DMT offers, for example, 256 independent sub-channels (or tones) divisionally assigned to the bandwidth from 0 kHz to 1.104 MHz at intervals of 4.3125 kHz. The bandwidth of 0~20 kHz is used for the plain old telephone service (POTS) region.

As shown in FIG. 1, an analog signal RX arriving through a data transmission channel (e.g., a telephone network) is applied to the ADC 11. The ADC 11 converts the received analog signal RX into a digital signal. The converted digital signal is applied to the TEQ 12.

The TEQ 12 removes portions of inter-symbol interference (ISI) of the digital signal generated by the ADC 11. A data stream synchronized in a predetermined time domain is applied to the S/P converter 13 from the TEQ 12. The S/P converter 13 receives and stores the serial data stream in sequence and outputs the stored samples in parallel by N packets (e.g., 256 packets). The 256 samples are provided to 256-point FFT 14 to be converted into frequency-domain symbols. The frequency-domain symbols are applied to the FEQ 15. The FEQ 15 corrects amplitudes and phases of the symbols and the corrected symbols are applied to the QAM decoder 16. The QAM decoder 16 carries out a QAM decoding operation against the input symbols and outputs reception data RD.

In order to maintain the continuity between the DMT symbols, the frequency of a sampling clock signal of the ADC 11 in the remote terminal 10 should be integer times of a pilot tone (i.e., #64 tone) frequency. For instance, when the frequency of the pilot tone frequency output from the FEQ 15 is 276 kHz and the sampling frequency is 2.208 MHz, one period of the pilot tone is composed of 8 samples. Therefore, the sampling clock signal of the ADC 11 can be obtained by abstracting an eight times frequency from the pilot tone frequency which has been synchronized to a reference signal REF.

The phase detector 21 in the DPLL 17 compares the reference signal REF with the pilot tone that the #64 tone provided from the FEQ 15. Here, the frequency of the reference signal REF is 276 kHz and the constellation value for the pilot tone is (+1, +i). When the constellation value of the reference signal REF is (Xref, Yref) and the constellation value of the pilot tone output from the FEQ 15 is (Xr, Yr), a phase error PE is defined as follows.

$$PE = \tan^{-1} \approx Xr - Yr \qquad \text{Equation 1}$$

The phase detector 21 generates a signal corresponding to a phase difference between the pilot tone z64 and the reference signal REF. The loop filter 22 is formed of a secondary-order active loop filter, preferably designed with a parameter value established by considering acquisition times and tracking errors.

The DAC 18 converts a digital signal of the DPLL 17 into an analog signal. The VCXO 19 generates a sampling clock to the ADC 11 in response to the analog signal provided by the DAC 18.

FIG. 2 enumerates various types of transceiving signals defined by the ITU-T G.992.1 standard. In the chart of FIG. 2, ATU-C represents signals transmitted to a remote terminal from a central station while ATU-R represents signals transmitted to a central station from a remote terminal.

The G.992.1 annex-A standard defines signals that conduct training processes for modules constructed in a transceiver and an initialization process after the training processes. In FIG. 2, the pilot signal represents the 4QAM signal of 276 kHz mapped at constellation (+1, +i) and the REVERB signal is a pseudo-random signal having a phase difference of 180 degrees from the pilot signal. After completing a clock recovery operation between the central station and the remote terminal by means of the pilot signal, the training process of the FEQ 15 is carried out by means of the REVERB signal. A procedure of the training is segmented into multiple states in accordance with a signal to be transmitted, in which timing recovery should precede the equalizer training procedure. A signal generated by the FFT 14 after being sampled by a fixed clock signal, Y, is represented as follows.

$$Y = H \times X \qquad \text{Equation 2}$$

In the Equation 2, the parameter X denotes a signal received from the central station, i.e., the REVERB signal, and the parameter H denotes a channel response. The ITU-T G.992.1 standard defines the REVERB signal as a periodic signal. Thus, the channel response H can be obtained from Y/X. It is generally known to apply the inverse of H to the equalizer and a correct channel response can result from securing a timing recovery.

As aforementioned, it is inevitable for ADSL network lines to be affected by crosstalk when they coexist with other communication lines within the same bundle of cable. FIG. 3 shows various patterns of crosstalk as an example, by which it is difficult to set an exact timing recovery. Moreover, as shown in FIG. 4, such crosstalk causes phase differences between the pilot tones on center of 45 degree that corresponds to the constellation (+1, +i).

FIG. 4 shows phase profiles of the pilot tones received through ADSL network lines, comparatively plotting them with crosstalk and without crosstalks, which are results of the PLL operation using the #64 tone among the reception signal (e.g., C-REVERB2 in FIG. 2) accepted during the training process. As shown in FIG. 4, the phase of the #64 tone is close to: 45 degrees when there is no crosstalk, while the phase considerably strays from 45 degrees when there is crosstalk. Such results arise from physical characteristics of telephone lines in which the SNR of the #64 tone; is reduced by crosstalk effects.

As described above, since the conventional ADSL receiver is designed to carry out the PLL operation using the #64 tone, deterioration of SNR of the #64 tone may cause fluctuations in other channels. As a result, error rate after completing the equalization by the FEQ 15 is affected by the sum of phase transitions due to loop timing errors and physical channel noises. In this case, it is difficult to evaluate SNRs of sub-channels because of the physical characteristics of channels and because the SNRs of sub-channels are substantially degraded due to the loop timing errors.

In addition, as a data rate of system is proportional to the SNR, a lower SNR may cause the data rate to be insufficient to meet with its desired level. Therefore, minimization of the deterioration of SNR to enhance the data rate permissible in physical conditions of the channel is desired.

SUMMARY OF THE INVENTION

It is, therefore, an object of the present invention to provide an ADSL system with a higher data rate.

The present invention is therefore directed to an asymmetrical digital subscriber line (ADSL) communication system that enhances the signal-to-noise ratio (SNR) of the received signals by conducting a PLL process with a tone conditioned on the most superior SNR, rather that a fixed tone, for example the #64 fixed tone. An improvement in data rate is thereby achieved.

According to an aspect of the present invention, there is provided a digital communication system using telephone lines, including: an analog-to-digital converter for generating a time-domain digital signal from an analog signal received through the telephone line in response to a sampling clock signal; a converter for transforming the time-domain digital signal to frequency-domain digital signals; a frequency equalizer for conducting a frequency equalization of the frequency-domain digital signals; a selector for selecting one of the frequency-equalized digital signals; an operation block for setting the selected digital signal to a value based on the selected one of the digital signals; and a loop circuit for conducting a PLL operation for the selected digital signal to generate the sampling clock signal to be applied to the analog-to-digital converter.

The digital communication system is an ADSL system. The selected digital signal has the most superior SNR characteristic among the digital signals.

The operation block includes: a tap table for storing a plurality of tap coefficients and outputting one of the tap coefficients which corresponds to a constellation position of the selected digital signal; and a tap operation block for conducting an operation with the selected digital signal and the tap coefficient provided from the tap table.

In another embodiment, a digital communication system using telephone lines includes: an analog-to-digital converter for generating a time-domain digital signal from an analog signal received through the telephone line in response to a sampling clock signal; a converter for transforming the time-domain digital signal to frequency-domain digital signals; a selector for selecting one of the frequency-domain digital signals; a sign decider for outputting a sign signal generated by discriminating a constellation position of the selected digital signal; and a loop circuit for conducting a PLL operation for the selected digital signal to generate the sampling clock signal to be applied to the analog-to-digital converter.

The sign decider includes: a multiplier receiving a real and imaginary constellation value of the selected digital signal; and a sign decision block for generating the sign signal corresponding to a sign of an output of the multiplier.

The loop circuit includes: a phase detector for generating a phase difference signal informing of a phase difference between the selected digital signal and a reference signal; a filter circuit for filtering the phase difference signal; and a converter for transforming an output of the filter into an analog signal to generate the sampling clock signal to be applied to the analog-to-digital converter.

The present invention will be better understood from the following detailed description of exemplary embodiments thereof taken in conjunction with the accompanying drawings.

BRIEF DESCRIPTION OF THE DRAWINGS

The forgoing and other objects, features and advantages of the invention will be apparent from the more particular description of preferred embodiments of the invention, as illustrated in the accompanying drawings in which like reference characters refer to the same parts throughout the different views. The drawings are not necessarily to scale, emphasis instead being placed upon illustrating the principles of the invention:

FIG. 2 is a chart enumerating the collection of tranceiving signals defined in ITU-T G.992.1;

DETAILED DESCRIPTION OF PREFERRED EMBODIMENTS

It should be understood that the description of the preferred embodiment is merely illustrative and that it should not be taken in a limiting sense. In the following detailed description, several specific details are set forth in order to provide a thorough understanding of the present invention. It will be apparent, however, to one skilled in the art that the present invention may be practiced without these specific details. Practical embodiments of the invention will be explained in conjunction with the drawings.

Figure 5:
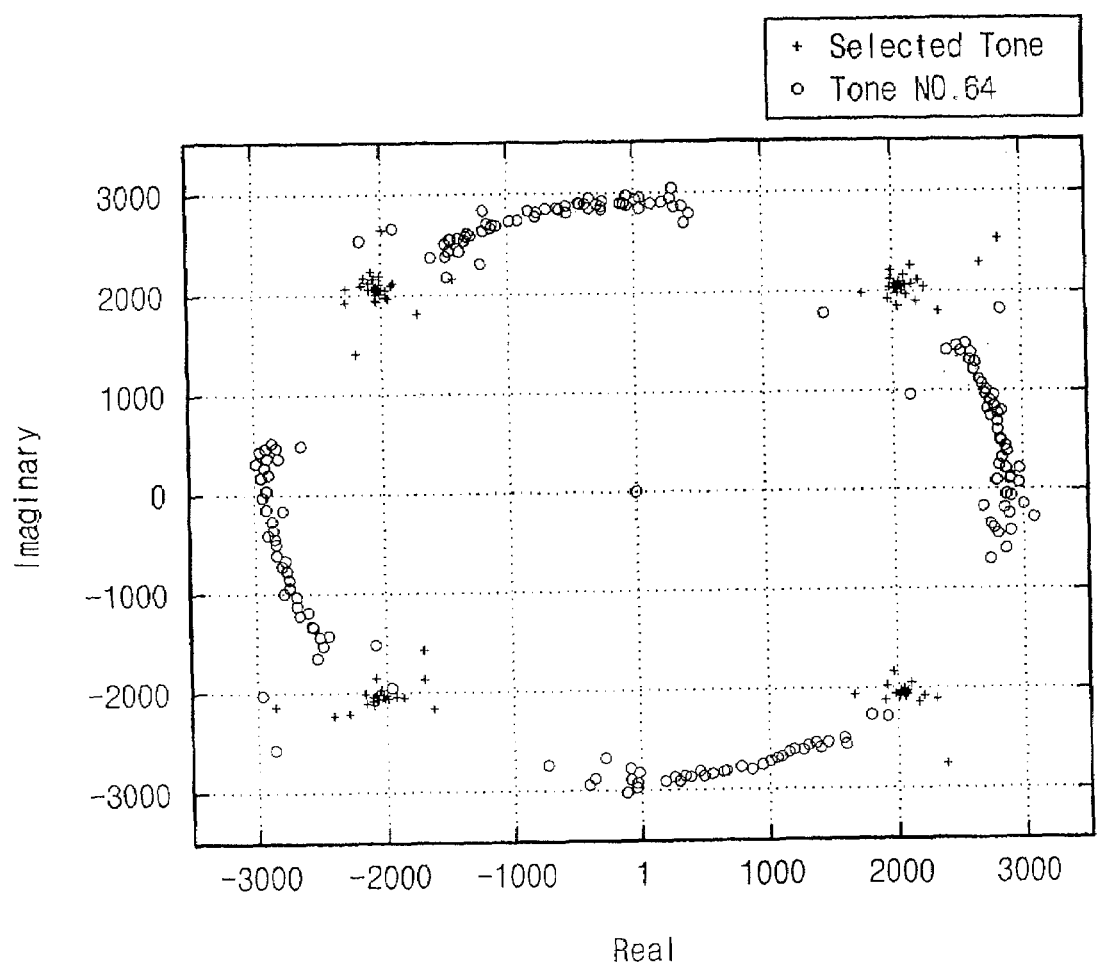
FIG. 5 is a graph illustrating phases of received pilot tones with and without crosstalk on an ADSL communication line.

The ADSL annex-A standard defines the #64 tone as a reference signal to obtain loop timing. Thus, a central station loads a signal with constellation information of (+1, +i) on the #64 tone, and then a remote terminal obtains the loop timing between the central station and itself by conducting a PLL operation with the #64 tone. During such a process of channel analysis, it is impossible for the remote terminal to obtain the loop timing from other tones because the central station sends irregular constellation values to other tones. That is, as shown in FIG. 5, a QAM analysis resulting from a PLL operation with a tone other than the #64 tone shows that the phases are considerably distance from the 45 degree mark. This is because the central station transmits the #64 tone to a fixed constellation position, while other tones are positioned with QAM locations in disorder. Thus, as the phase of the reception signal changes every frame in the PLL operation for tones other than the #64 tone, the output value of the phase detector becomes insignificant and the QAM analysis result is figured in the pattern of rotating around the reference position.

The present invention overcomes the phase variation for every frame even for tones other than the #64 tone, while a superior SNR tone among the 0 to 255 tones is used to conduct the PLL operation.

Figure 6:
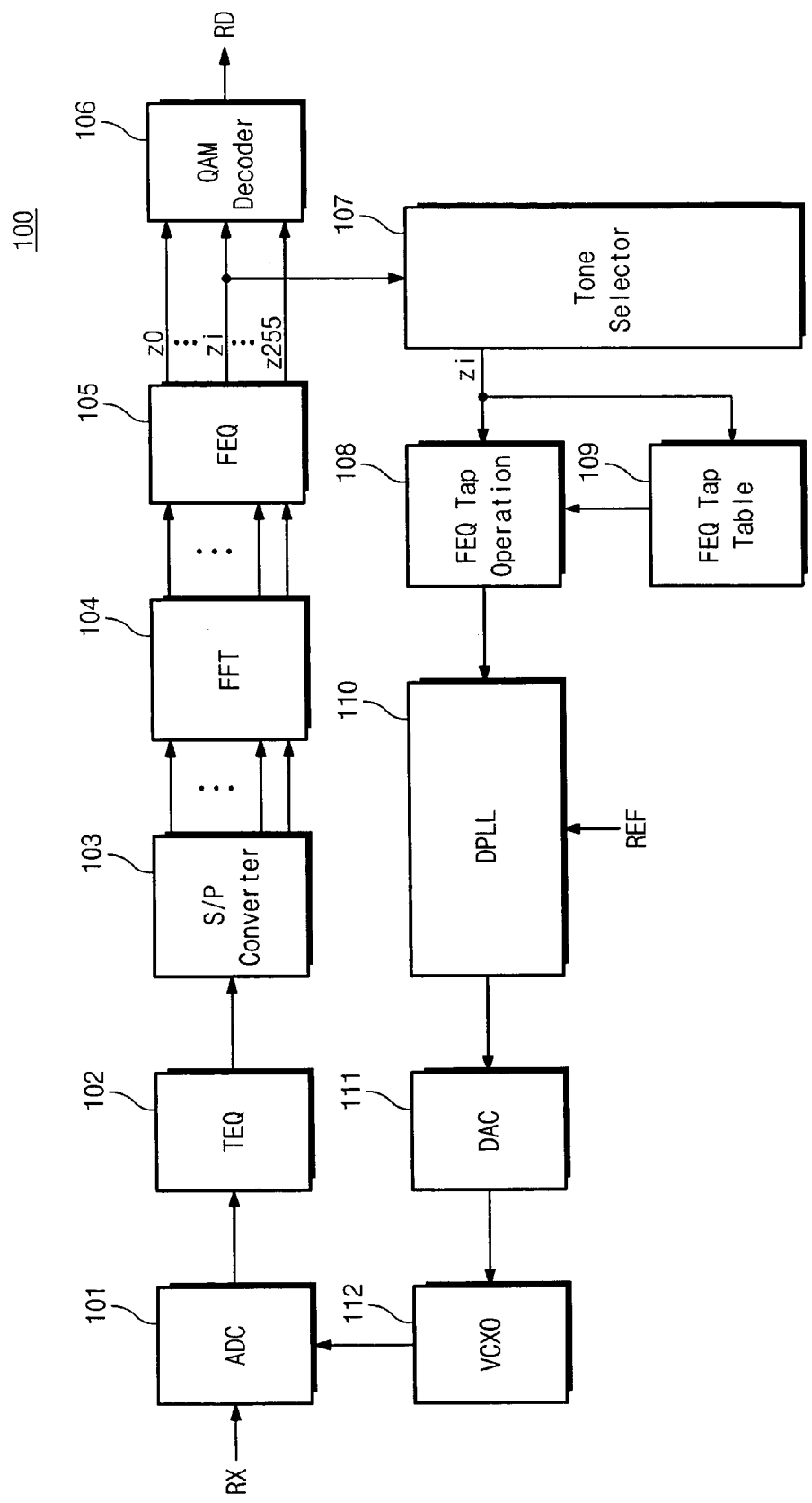
FIG. 6 is a block diagram of an ADSL receiver according to, an embodiment of the present invention.

FIG. 6 shows an ADSL receiver according to an embodiment of the present invention. Referring to FIG. 6, the ADSL receiver 100 includes an analog-to-digital converter (ADC) 101, a time-domain equalizer (TEQ) 102, a serial-to-parallel (S/P) converter 103, a fast Fourier transformer (FFT) 104, a frequency-domain equalizer (FEQ) 105, a QAM decoder 106, a tone selector 107, an FEQ tap operation block 108, an FEQ tap table 109, a digital phase lock loop (DPLL) 110, a digital-to-analog (DAC) converter 111, and a voltage-controlled crystal oscillator (VCXO) 112. Although not shown in FIG. 6, the DPLL 109 includes a phase detector and a loop filter.

As shown in FIG. 6, an analog signal RX received through a data transmission channel (e.g., a telephone network) is applied to the ADC 101. The ADC 101 converts the received analog signal RX into a digital signal. The converted digital signal is applied to the TEQ 102.

The TEQ 102 removes portions of inter-symbol interference of the digital signal output from the ADC 101. A data stream synchronized in a predetermined time domain is applied to the S/P converter 103 from the TEQ 102. The S/P converter 103 receives and stores the serial data stream in sequence and outputs the stored samples in parallel by N packets (e.g., 256 packets). The 256 samples are provided to 256-point FFT 104 to be converted into frequency-domain symbols. The frequency-domain symbols are applied to the FEQ 105. The FEQ 105 corrects amplitudes and phases of the symbols and the corrected symbols are applied to the QAM decoder 106. The QAM decoder 106 carries out a QAM decoding operation against the input symbols and outputs reception data RD.

The tone selector 107 selectively provides an alternative one of the 256 tones z0~z255 for the FEQ tap operation block 108 and the FEQ tap table 109. In selecting the tone, the tone selector 107 considers the level of SNR in the tones. For example, the tone having the highest SNR, e.g., zi (i is any one among 0~255), is selected by the tone selector 108.

The FEQ tap table 109 provides the FEQ tap operation block 108 with a tap that corresponds to a constellation value of the selected tone zi provided by the tone selector 107. The FEQ tap operation block 108 conducts an arithmetic process for the selected tone zi provided by the tone selector 106 and the tap transferred by the FEQ tap table 109.

Tones other than the #64 tone may be located at any one of the first through fourth quadrants on the complex plain and randomized with their QAM constellation positions every frame. Here, constellation positions of tones output by the FEQ. 105 correspond to one of (+1, +i), (−1, +i), (−1, −i), and (+1, −i). Therefore, provided it is informed of the constellation information for the tone zi selected by the tone selector 107, it is practicable to change the constellation of the selected tone zi to (+1, +i). The following Table 1 shows the contents stored in the FEQ tap table 109 that provides the FEQ tap operation block 108 with tap coefficients corresponding to the constellation of the selected tone zi.

TABLE 1

| Constellation of Selected Tone | Corresponding Tap Coefficient |
|---|---|
| (+1, +i) | (a, bi) |
| (−1, +i) | (c, di) |
| (−1, −i) | (e, fi) |
| (+1, −i) | (g, hi) |

In Table 1, the tap coefficients are prepared for converting a constellation value of the selected tone zi into (+1, +i). Hereby, the FEQ tap operation block 108 transfers the constellation value of the selected tone zi to (+1, +i) by operating the selected tone zi and the tap coefficient.

During this, the tap coefficients stored in the FEQ tap table 109 are renewed in accordance with the selected tone. The tap coefficient is established according to the following Equation 3.

$$X \times F = \text{Desired constellation value} \quad \text{Equation 3}$$

In the Equation 3, the parameter X denotes the constellation value of the selected tone zi, which is one of (+1, +i), (−1, +i), (−1, −i), and (+1, −i), the parameter F is a tap coefficient directed to the desired constellation value (+1, +i).

The FEQ tap table 109 generates a modified tap coefficient, every frame, and the FEQ tap operation block 108 conducts a re-operation process every frame. Thus, the DPLL 110 receives a tone set on a constant position.

Figure 7:
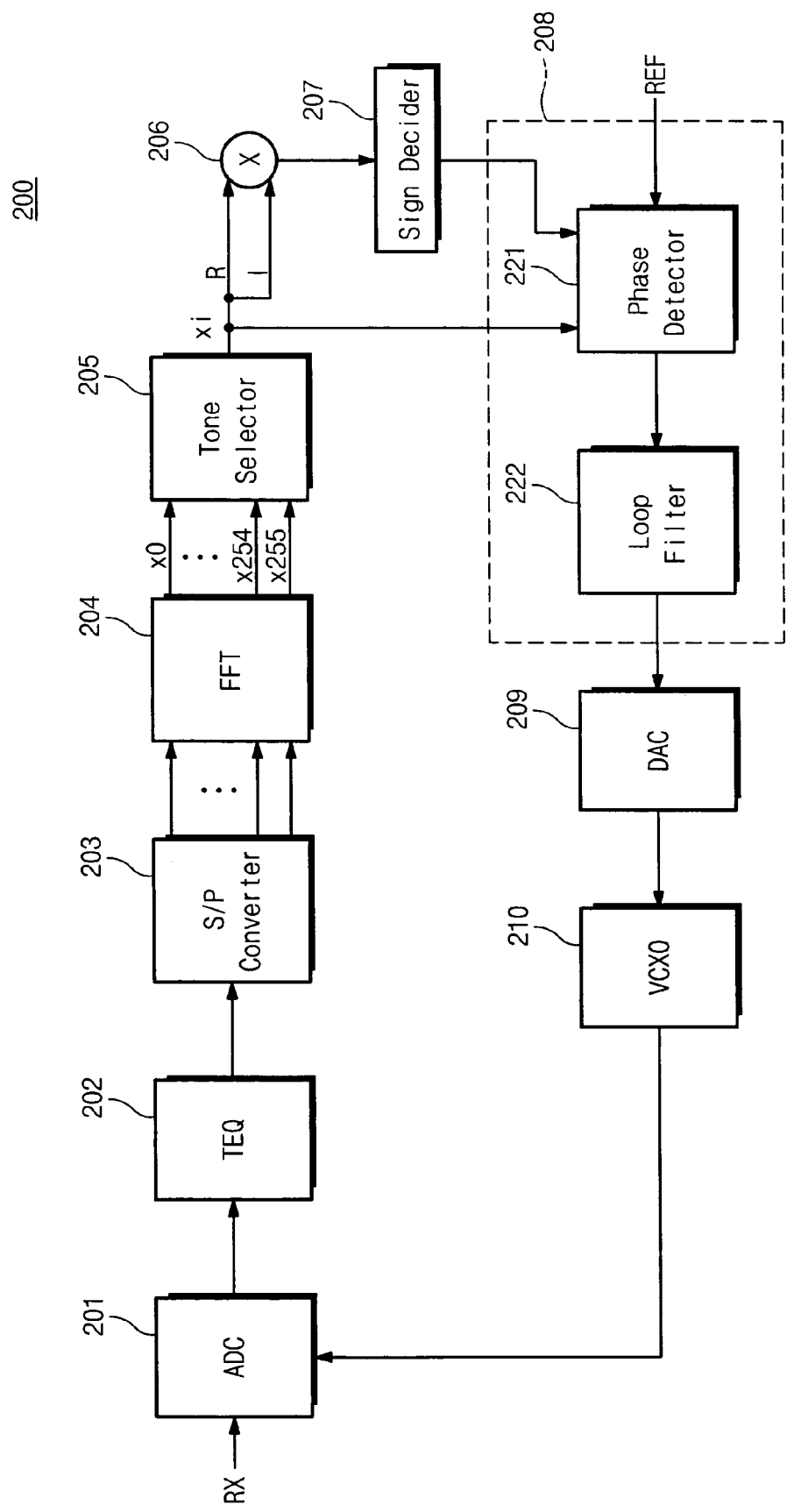
FIG. 7 is a block diagram of an ADSL receiver according to another embodiment of the present invention.

FIG. 7 illustrates a functional structure of an ADSL receiver according to the present invention. Referring to FIG. 7, the receiver 200 includes an analog-to-digital converter (ADC) 201, a time-domain equalizer (TEQ) 202, a serial-to-parallel (S/P) converter 203, a fast Fourier transformer (FFT) 204, a tone selector 205, a multiplier 206, a sign decider 207, a digital phase lock loop (DPLL) 208, a digital-to-analog (DAC) converter 209, and a voltage-controlled crystal oscillator (VCXO) 210. The DPLL 208 includes a phase detector 221 and a loop filter 222.

The tone selector 205 selects an alternative one of 256 tones x0~x255, for example with regard to the tone that is associated with the highest SNR, e.g., xi (i is any one among 0~255). The multiplier 206 conducts multiplication with a real constellation value (R) and an imaginary constellation value (I) of the selected tone xi. The sign decider 207 discriminates a constellation position of the selected tone xi from a sign of the arithmetic result provided by the multiplier 206 and then determines the sign of the phase difference. For instance, the selected tone is determined to be in the first or third quadrant if the arithmetic result is signed with a positive number, while it is determined to be in the second or fourth quadrant if the arithmetic result is signed with a negative number. The sign decider 207 generates a sign signal that maintains the sign of a phase difference set by the phase detector 221 when the arithmetic result is a positive number or inverses the sign of the phase difference when the arithmetic result is a negative number. The determination of a sign of the phase difference is based on the following.

The phase detector 221 determines the phase difference between a reference tone REF and the tone xi designated by the tone selector 205. As explained in Equation 1 above, assuming that the constellation of the reference signal REF is (Xref, Yref) and the constellation of the selected tone xi is (Xr, Yr), the phase difference PE is obtained from PE=tan$^{-1}$(Yref×Xref−Xref×Yr). Here, PE≈Xr−Yr if the constellation of the reference signal REF is (+1, +i).

Figure 8:
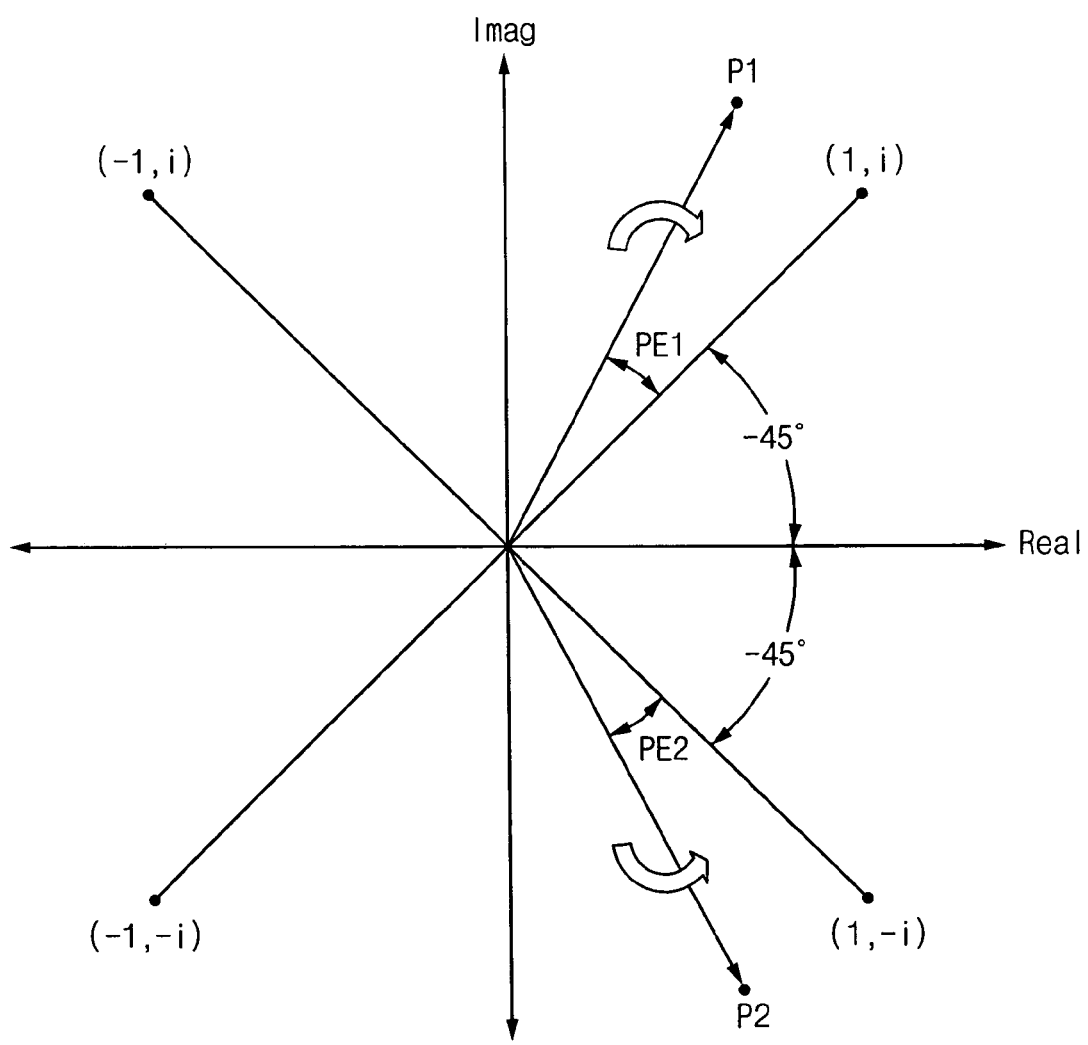
FIG. 8 is a polar constellation illustrating a manner for determining a sign of a phase difference when a selected tone is assigned into one of first through fourth quadrants.

FIG. 8 depicts an exemplary way of determining the sign of the phase difference when the selected tone xi is positioned in one of the first through fourth quadrants. When the reference signal REF is positioned at (+1, +i) and the selected tone xi is at P1 in the first quadrant, its phase difference PE1 is obtained from $X_{P1} - Y_{P1}$. When the selected tone xi is located at P2 in the fourth quadrant, it is necessary to calculate a phase difference PE2 by transposing the positional constellation of the selected tone xi into the first quadrant. That is because the computation of the phase difference assumes that the reference signal REF is assigned to the first quadrant wherever the reference signal REF is practically positioned in any one of the four quadrants. Accordingly, the phase difference is set by the sign decider 207 with the sign that is maintained originally when the selected tone xi is in the first or third quadrant, or reversed when the selected tone is in the second or fourth quadrant.

Returning to FIG. 7, the phase detector 221 generates a signal corresponding to the phase difference between the selected tone xi and the reference signal REF. The loop filter 222 is formed, for example, of a secondary-order active loop filter, the parameters of which are established in consideration of acquisition times and tracking errors.

The DAC 209 converts the digital signal output by the loop filter 222 into an analog signal. VCXO 210 generates a sampling clock to be applied to the ADC 201 in response to the analog signal generated by the DAC 18.

Figure 1:
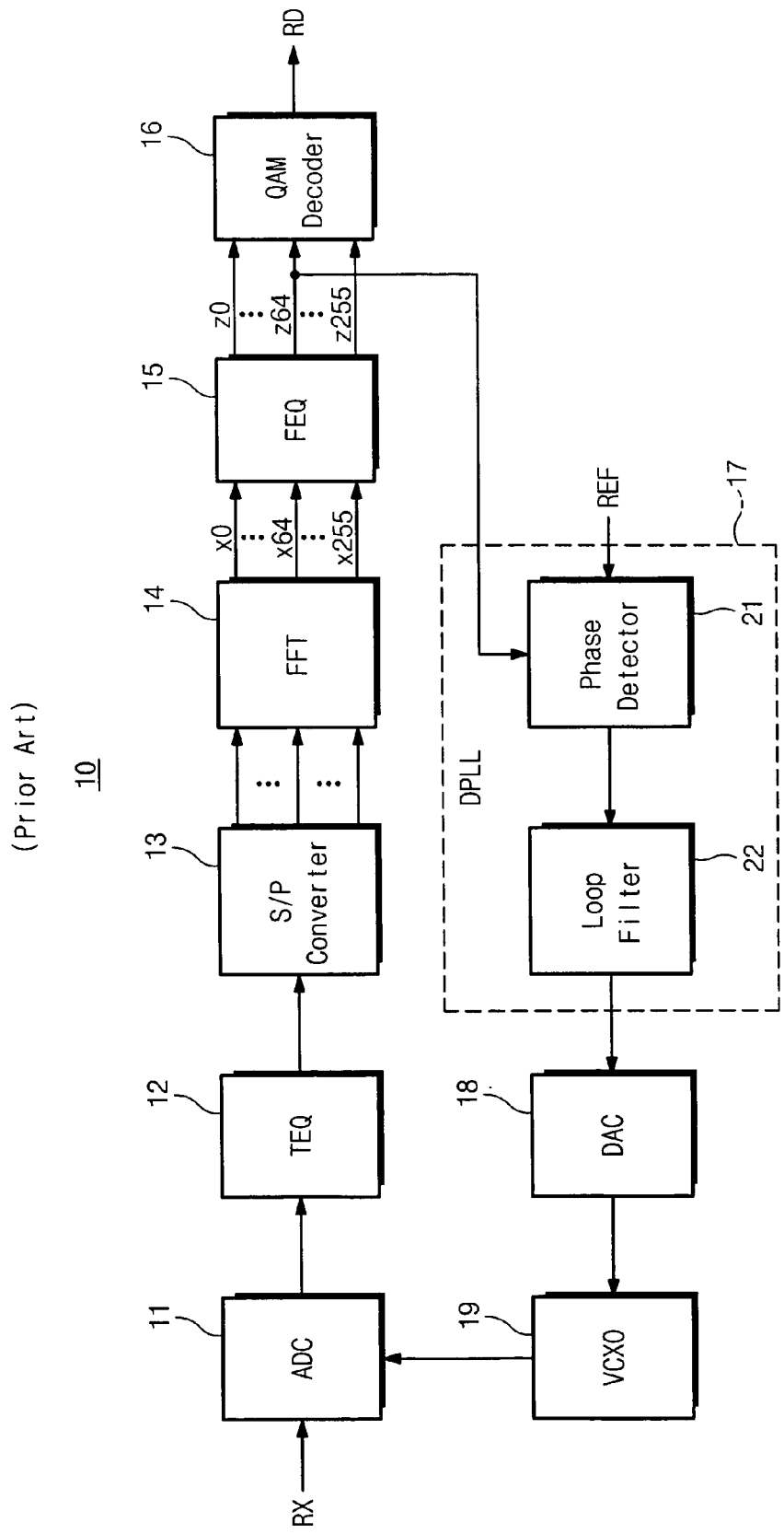
FIG. 1 is a block diagram of an ADSL receiver.
Figure 3:
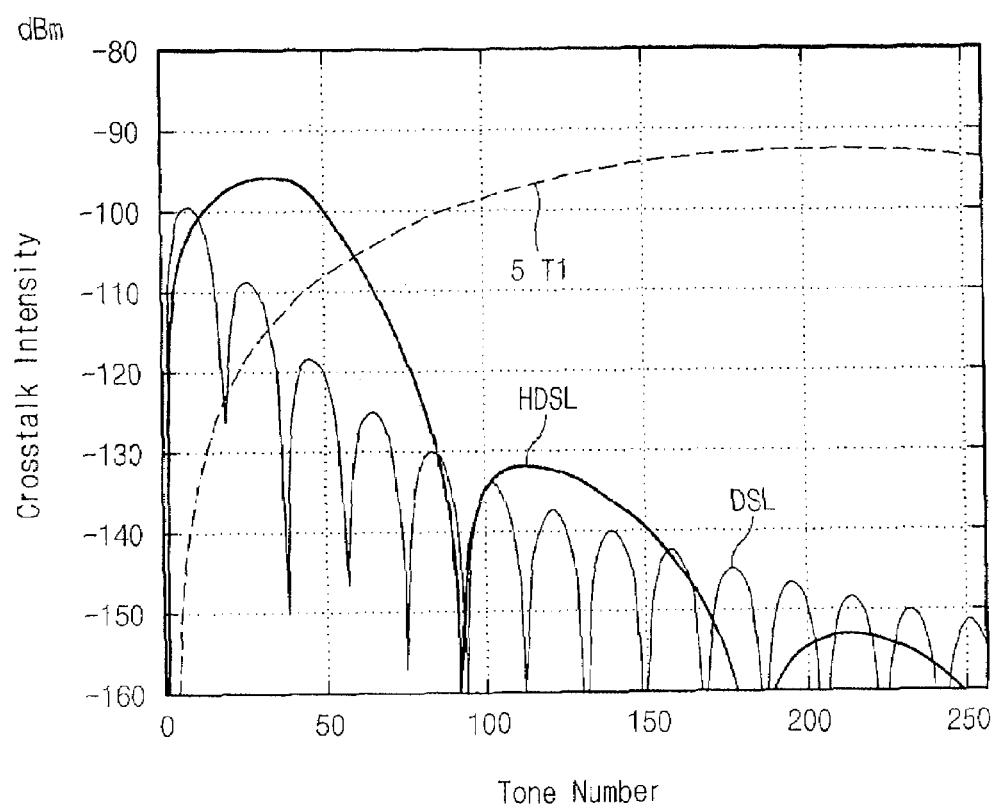
FIG. 3 is a graphic diagram illustrating exemplary patterns of various crosstalk.
Figure 4:
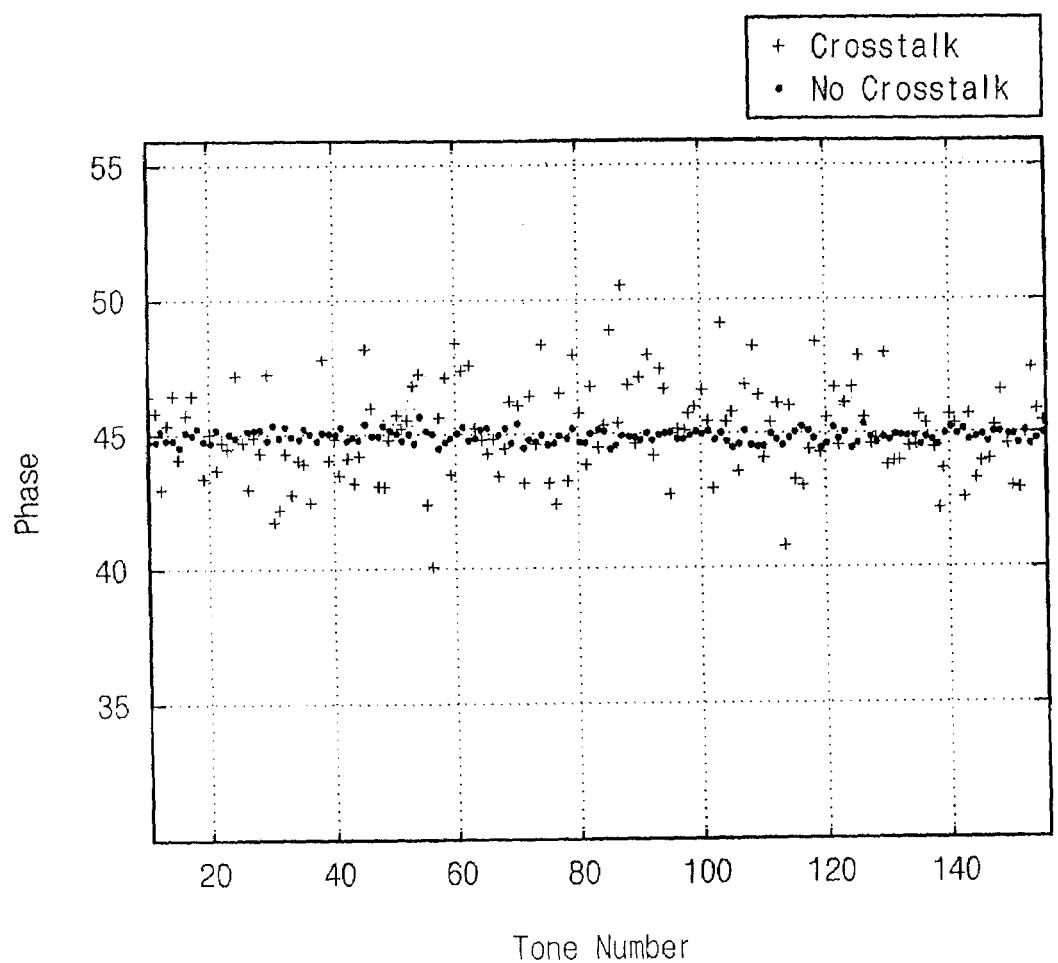
FIG. 4 is a graphic diagram illustrating phases of reception signals with and without crosstalk on an ADSL communication line.

The tone selector 205 renders the tone selection based on peripheral environments of the ADSL system, for which a tone characterized of the most superior SNR is adopted in accordance with the effects of crosstalk induced on ADSL lines and is used as the reference signal for the PLL operation. A value of SNR may be obtained, for example, by evaluating line noise in an echo period for which there is no signal transmission from the central station during the training process. The crosstalk on the same line maintains a constant pattern as shown in FIG. 4.

Figure 9:
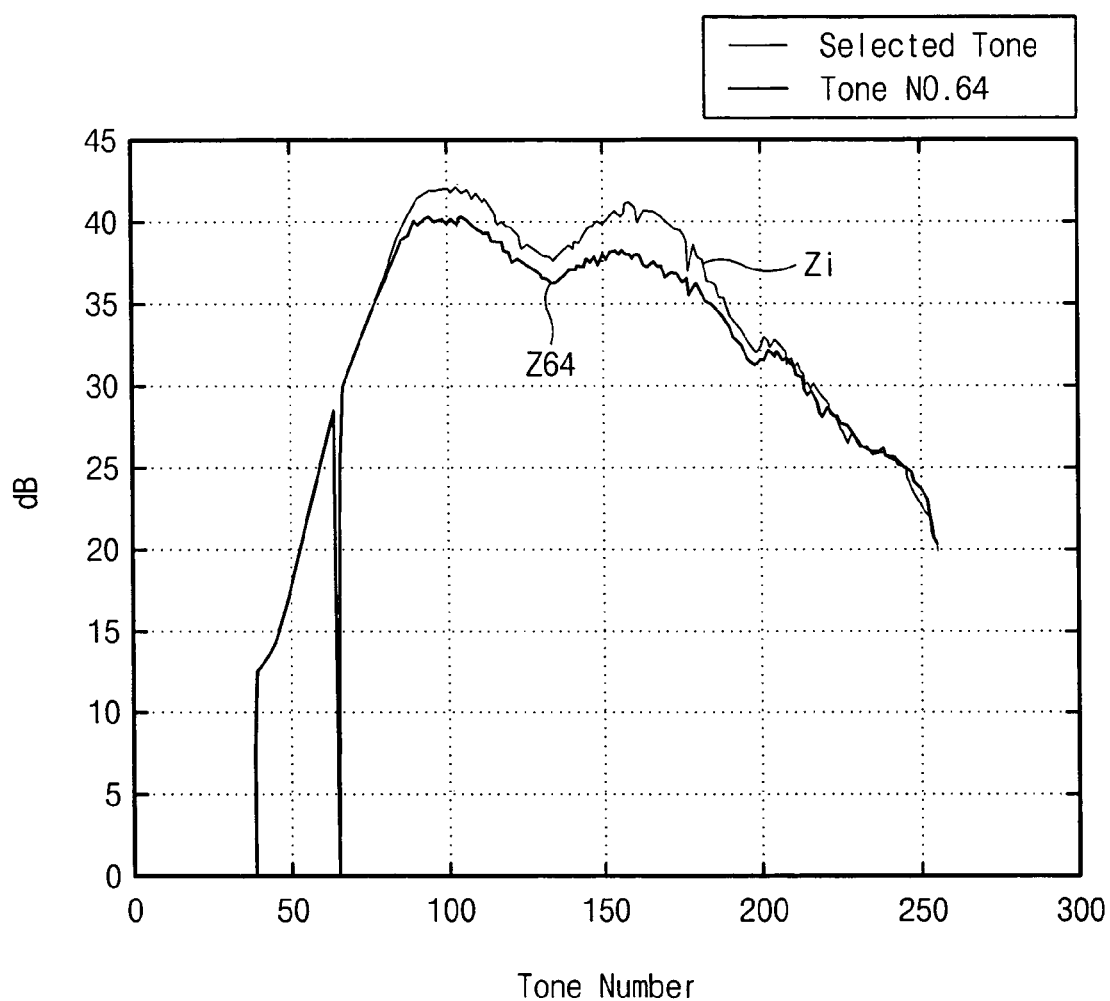
FIG. 9 is a graph illustratively comparing the case of using a conventional tone #64 as a reference signal of PLL, in the case of using the most superior SNR tone as the reference signal of the PLL.

FIG. 9 depicts SNR patterns comparing the conventional case of using the #64 tone with the present case of using the superior SNR tone, as the PLL reference signal. As shown in FIG. 9, it can be seen that the performance of SNR is advanced in the region between the 70'th through 150'th tones by 2~3 dB.

According to the embodiments of the invention, as the most superior SNR tone is used for the PLL operation as a reference signal rather than the #64 tone, in an ADSL receiver, it is possible to improve the characteristics of SNR of the reception signal. As a result, the data rate of an ADSL network system can be improved.

Although the preferred embodiments of the present invention have been disclosed for illustrative purposes, those skilled in the art will appreciate that various modifications, additions and substitutions are possible, without departing from the scope and spirit of the invention as described in the accompanying claims.

What is claimed is:

1. A digital communication system using telephone lines, comprising:
   an analog-to-digital converter that generates a time-domain digital signal comprising frames from an analog signal received through the telephone line in response to a sampling clock signal;
   a converter that transforms the time-domain digital signal to frequency-domain digital signals;

a frequency equalizer that conducts a frequency equalization of the frequency-domain digital signals;

a selector that selects a digital signal of the frequency-equalized digital signals, wherein the selected digital signal has the highest signal-to-noise ratio (SNR) among the digital signals;

an operation block that receives the selected digital signal having the highest SNR from the selector, and generates a selected highest SNR digital signal set at a constant position by performing an operation every frame on a constellation value of the selected digital signal having the highest SNR and a coefficient corresponding to the constellation value of the selected digital signal having the highest SNR to set the selected digital signal having the highest SNR at the constant position, wherein the operation block modifies the coefficient to generate a modified coefficient corresponding to the constellation value of the selected digital signal having the highest SNR every frame; and a loop circuit that receives from the operation block the selected highest SNR digital signal set at the constant position and conducts a PLL operation using the selected digital signal having the highest SNR set at the constant position as a reference signal to generate the sampling clock signal to be applied to the analog-to-digital converter.

2. The digital communication system of claim 1, wherein the digital communication system is an ADSL system.

3. The digital communication system of claim 1, wherein the operation block comprises:

a tap table for storing a plurality of tap coefficients and outputting one of the tap coefficients which corresponds to a constellation position of the selected digital signal; and a tap operation block for conducting an operation with the selected digital signal and the tap coefficient provided from the tap table.

4. A digital communication system using telephone lines, comprising:

an analog-to-digital converter that generates a time-domain digital signal from an analog signal received through the telephone line in response to a sampling clock signal;

a converter that transforms the time-domain digital signal to frequency-domain digital signals;

a selector that selects a digital signal of the frequency-domain digital signals, wherein the selected digital signal has the highest signal-to-noise ratio (SNR) among the digital signals;

a sign decider that outputs a sign signal generated by performing a calculation on the selected digital signal having the highest SNR, and that discriminates a constellation position of the selected digital signal having the highest SNR based on a sign of a result of the calculation, wherein the sign decider outputs the sign signal to one of maintain the sign of the result and change the sign of the result, depending on the constellation position; and a loop circuit that receives the selected digital signal having the highest SNR and having the discriminated constellation position from the sign decider and that conducts a PLL operation using the selected digital signal having the highest SNR as a reference signal to generate the sampling clock signal to be applied to the analog-to-digital converter.

5. The digital communication system of claim 4, wherein the sign decider comprises:

a multiplier performing the calculation on a real and imaginary constellation value of the selected digital signal and generating the result; and a sign decision block for generating the sign signal corresponding to a sign of an output of the multiplier.

6. The digital communication system of claim 5, wherein the sign signal is provided to inverse a phase difference signal when the output of the multiplier is a negative number.

7. The digital communication system of claim 4, wherein the loop circuit comprises:

a phase detector for generating a phase difference signal related to a phase difference between the selected digital signal and a reference signal;

a filter circuit for filtering the phase difference signal; and a converter for transforming an output of the filter into an analog signal to generate the sampling clock signal to be applied to the analog-to-digital converter.

8. The digital communication system of claim 7, wherein the decider inverses a sign of the phase difference signal when the arithmetic result of the sign decider is a negative number.

* * * * *